(12) United States Patent
Bohm (10) Patent No.: US 10,519,301 B2
(45) Date of Patent: Dec. 31, 2019

(54) METHOD OF RECYCLING RUBBER

(71) Applicant: APPIA, LLC, Akron, OH (US)

(72) Inventor: Georg Bohm, Akron, OH (US)

(73) Assignee: APPIA, LLC, Akron, OH (US)

( * ) Notice: Subject to any disclaimer, the term of this patent is extended or adjusted under 35 U.S.C. 154(b) by 12 days.

(21) Appl. No.: 15/856,176

(22) Filed: Dec. 28, 2017

(65) Prior Publication Data

US 2018/0186974 A1   Jul. 5, 2018

Related U.S. Application Data

(60) Provisional application No. 62/440,118, filed on Dec. 29, 2016, provisional application No. 62/552,471, filed on Aug. 31, 2017.

(51) Int. Cl.
| | | |
|---|---|---|
| C08J 3/24 | (2006.01) | |
| C08J 11/06 | (2006.01) | |
| C08L 9/00 | (2006.01) | |
| C08L 19/00 | (2006.01) | |
| C09C 3/00 | (2006.01) | |
| C08C 3/00 | (2006.01) | |

(52) U.S. Cl.
CPC .................. *C08L 9/00* (2013.01); *C08C 3/00* (2013.01); *C08J 3/24* (2013.01)

(58) Field of Classification Search
None
See application file for complete search history.

(56) References Cited

U.S. PATENT DOCUMENTS

| | | | |
|---|---|---|---|
| 3,003,990 A | | 10/1961 | Umland, II et al. |
| 3,489,710 A | * | 1/1970 | Bonotto ................. C08L 19/003 |
| | | | 524/518 |
| 4,231,410 A | | 12/1980 | Vannan |
| 4,481,335 A | | 11/1984 | Stark, Jr. |
| 5,010,122 A | * | 4/1991 | Koski ....................... C08K 5/54 |
| | | | 524/80 |
| 5,376,700 A | | 12/1994 | Yamazaki |

(Continued)

FOREIGN PATENT DOCUMENTS

| | | | |
|---|---|---|---|
| CN | 102775633 A | * | 11/2012 |
| EP | 0690091 A1 | | 1/1996 |

(Continued)

*Primary Examiner* — Tae H Yoon
(74) *Attorney, Agent, or Firm* — Dureska & Moore, LLC; Brent L. Moore (57) ABSTRACT

A method of recycling rubber includes pre-treating vulcanized ground rubber to prevent the vulcanized ground rubber from encountering significant additional crosslinking during co-vulcanization with fresh rubber compound, and promoting better bonding between the vulcanized ground rubber and the fresh rubber compound. The ground vulcanized rubber can be coated with a layer of non-vulcanized rubber that includes cure inhibitors or other ingredients dispersed within the layer to aid in the coating process and/or co-vulcanization of the vulcanized ground rubber and fresh rubber compound. The vulcanized ground rubber can also be pre-treated with a mixture of at least one chemical curing agent inhibitor and a solvent capable of solubilizing the chemical curing agent inhibitor and dispersing the curing agent inhibitor within the vulcanized ground rubber.

18 Claims, 4 Drawing Sheets

(56) References Cited

U.S. PATENT DOCUMENTS

| | | |
|---|---|---|
| 5,514,721 A | 5/1996 | Hart |
| 5,538,793 A | 7/1996 | Inokuchi et al. |
| 5,602,186 A | 2/1997 | Myers et al. |
| 5,770,632 A | 6/1998 | Sekhar et al. |
| 6,265,454 B1 * | 7/2001 | McNutt .................. C08J 11/06 521/40 |
| 6,541,526 B1 | 4/2003 | Goldshtein et al. |
| 6,831,109 B1 | 12/2004 | Beirakh et al. |
| 6,924,319 B1 | 8/2005 | Alsdort et al. |
| 7,108,207 B2 | 9/2006 | Waznys et al. |
| 7,445,170 B2 | 11/2008 | Cialone et al. |
| 9,175,155 B2 | 11/2015 | Rosenmayer et al. |
| 9,574,069 B2 | 2/2017 | Jasiunas et al. |
| 9,815,974 B2 * | 11/2017 | Jasiunas .................. B60C 9/02 |
| 2004/0030053 A1 * | 2/2004 | Izumoto .................. C08J 11/06 525/326.1 |
| 2006/0258779 A1 | 12/2006 | Bailey et al. |
| 2009/0289396 A1 | 12/2009 | Walters |
| 2010/0317752 A1 | 12/2010 | Sekhar |
| 2012/0116006 A1 | 5/2012 | Chun et al. |
| 2012/0316283 A1 | 12/2012 | Rosenmayer et al. |
| 2014/0088258 A1 | 3/2014 | Papp et al. |
| 2015/0197581 A1 | 7/2015 | Asadauskas et al. |

FOREIGN PATENT DOCUMENTS

| | | |
|---|---|---|
| EP | 0748837 A1 | 12/1996 |
| EP | 1279698 A1 | 1/2003 |
| JP | H08-12815 A | 1/1996 |
| WO | WO 2005/028552 * | 3/2005 |
| WO | 2010081632 A1 | 7/2010 |
| WO | 2014042510 A1 | 3/2014 |

* cited by examiner

METHOD OF RECYCLING RUBBER

CROSS-REFERENCE TO RELATED APPLICATION

This application claims the benefit of U.S. Provisional Patent Application Ser. No. 62/440,118, filed Dec. 29, 2016, and U.S. Provisional Patent Application Ser. No. 62/552,471, filed Aug. 31, 2017.

BACKGROUND OF THE INVENTION

Technical Field

The invention relates generally to recycling of sulfur-cured or sulfur vulcanized rubber compounds in order to allow reuse of the sulfur-cured rubber compounds without appreciable loss in performance of the resulting rubber compound. More particularly, the invention is directed to a method, and product thereof, for recycling rubber compounds which includes adding a coating and/or chemical curing agent inhibitor to the reused sulfur-cured rubber, which prevents the reused rubber from encountering significant additional crosslinking (a second vulcanization) during the vulcanization of the fresh rubber compound to which it was added and promotes improved bonding between the reused sulfur-cured rubber and the fresh rubber compound in which it is incorporated. This method of recycling rubber eliminates the need to devulcanize the recycled sulfur-cured rubber prior to vulcanization of the mixture of recycled rubber and fresh rubber compound, thereby eliminating an often complex step of recycled rubber devulcanization prior to mixing with fresh rubber compound and decreasing operational costs. In addition, the method of recycling rubber allows a greater percentage of recycled rubber to be utilized in the rubber recycling process compared to prior art recycling methods while providing a recycled rubber product with comparable or increased performance.

Background Art

The rubber compounds used in vehicle tires are composite materials that include polymers, such as natural rubber or synthetic rubbers, that have been blended with reinforcing fillers, such as carbon black or silica, as well as with a variety of additives such as sulfur. The tire is assembled from a multitude of extruded or calendered components into the basic circular shape and is then molded and vulcanized (cured) in a tire press. The curing process of the tire is well known in the industry. It generally includes incorporating in the tire compounds a mixture of curing agents including an accelerator, sulfur, and accelerator activating compounds, such as stearic acid and zinc oxide, to facilitate the forming of sulfur cross-links upon applying heat to the rubber. Vulcanization results in the creation of a three dimensional network of sulfur cross-links within the rubber phase which link the various polymer chains to form a dimensionally stable thermoset composite which cannot be reshaped once it has been formed and cured. As a result, the recycling and reuse of vulcanized rubber products, such as worn tires, is difficult because the vulcanized rubber cannot be reshaped or simply reconstituted by dissolving it in a solvent in order to form the vulcanized rubber into a new shape. When reference is made to "recycled rubber" or "ground rubber" within this disclosure, it is to be understood that the term refers to previously vulcanized rubber.

Because of the ever increasing cost of oil derived raw materials, such as synthetic rubbers and carbon black fillers, and environmental waste concerns of such materials, there is considerable interest in the reuse of products such as worn vulcanized rubber tires made from these materials. Millions of used tires and other rubber products are discarded annually and only a minor fraction of them are being recycled into new products. The small amounts that are reused are usually first broken up to remove the non-rubber components of the tire, such as steel cords, beads, etc., and the remaining rubber compound is ground-up into particles of different sizes for use in a wide variety of applications, such as synthetic turf for football, soccer, and other sport related playing surfaces. Additional applications of these ground-up vulcanized rubber particles include use of the products in molded or extruded materials such as floor mats, etc. Reuse of such recycled rubber products in high performance products such as tires is limited to exceedingly small quantities because the ground rubber particles typically adversely affect key properties vital to the performance of the tire. Prior art rubber recycling methods have addressed some of the potential problems associated with recycling vulcanized rubber described above by utilizing a method to first devulcanize the previously cured and to be recycled rubber, prior to mixing the vulcanized ground rubber with fresh rubber compound and recurring/reprocessing. Although many different methods of devulcanization exist, the methods generally include first grinding the recycled vulcanized rubber to a suitable size and then employing a process to reduce the concentration of sulfur cross-links in the recycled rubber prior to mixing the recycled rubber with fresh rubber compound and ultimately curing the essentially devulcanized mixture. Although such methods can be effective in avoiding some of the potential issues with utilizing recycled rubber, the methods are generally complex, add significant time and cost to the rubber product manufacturing process, and often result in significant and very undesirable structural changes to the rubber molecules. While the use of untreated recycled rubber for high performance product applications is generally limited to about 1-2%, the use of partially devulcanized recycled rubber may only be slightly higher due to current limitations of the devulcanization process.

Most of these adverse effects result because the vulcanized ground rubber particles do not dissolve in the fresh rubber compound on a molecular scale, but instead stay intact and often act as defects once the product is processed by molding and vulcanization of the new composition. When reference is made to "fresh rubber compound" within this disclosure, it is to be understood that the term refers to a previously unvulcanized rubber compound. It was widely assumed that an improved retention of physical properties of rubber compounds comprising some vulcanized ground rubber particles can only be achieved by a devulcanization process which ideally would return the vulcanized ground rubber particles to their uncured state, but this result to date has not been achieved. Even though some sulfur crosslinks can be broken by different methods, micro and macrostructure changes occur that are mostly detrimental to the physical properties of the end product.

New results have shown that performance losses associated with vulcanized ground rubber particles combined with fresh rubber compounds are mainly due to two deficiencies that manifest themselves as a result of vulcanization, or co-vulcanization, of the vulcanized ground rubber particle and fresh rubber compound mixture. The first relates to a defect that results from poor bonding between the vulcanized ground rubber particles and the fresh rubber compound, and arises mainly because of insufficient molecular inter-diffusion of the rubber macromolecules. Therefore, when stress is applied to the resulting end rubber product, small gaps will form where the host fresh rubber compound separates from the vulcanized ground rubber particle, which can subsequently grow into larger propagating cracks that may ultimately cause failure.

The second defect arises because the vulcanized ground rubber particles generally will have much higher cross-link density in the final product than the fresh rubber compound in which they are embedded. More specifically, some of the sulfur and cure accelerators added to the fresh rubber compound for vulcanization will diffuse into the vulcanized ground rubber particles during the mixing, shaping, and vulcanization steps and cause the vulcanized ground rubber particles to experience a significant additional cross-linking or second vulcanization. This second vulcanization results in a much higher cross-link density, a higher modulus and a significantly lower extension to break in the ground rubber phase. Thus, when the final product is significantly deformed during use, premature failure may occur in the vulcanized ground rubber particles because this phase will reach conditions to failure at much lower strains compared to the fresh rubber compound phase. Micro-cracks formed in the process will at first propagate through the particle and then continue to propagate through the product, potentially causing it to fail during use. The difference in moduli will, on deformation, also result in interfacial stresses between the ground rubber particles and the surrounding fresh rubber compound host matrix that can significantly promote micro-separations (gaps), referred to earlier, and ultimately lead to growing cracks and product failure. These defects manifest themselves even at relatively low vulcanized ground rubber concentrations resulting in a reduced tensile strength, poor cut growth performance, and reduced durability. Therefore, there is a great reluctance on the part of many tire manufacturers to incorporate tire buffings and ground rubber particles recycled from whole tires into fresh rubber compounds for tires due to the problems described above and the to be expected reductions in tire performance.

Many studies conducted and often published in journals show that the incorporation of recycled rubber from spent tires into fresh rubber compound generally results in a product having significantly diminished physical properties, such as a reduction in tensile strength, reduced durability and poor cut growth performance. It was argued that many factors contributed to these diminished physical properties, including differences in the composition of the vulcanized ground rubber particles from the fresh rubber compound, as well as exposure of the vulcanized ground rubber particles to extended periods of heat and oxidative environments, etc., during the period when the recycled rubber was part of a tire in service. However, recent testing has shown that eliminating these factors still results in a compound having significantly diminished physical properties. For example, freshly prepared cryogenically ground rubber particles made from a typical carbon black reinforced stock with a composition set forth in Table 1 below, incorporated at a concentration level of 5-20 phr into a fresh rubber compound "of the same composition" yield the results set forth in Table 2 below. It should be noted that in samples UR2, UR4, and UR6, the concentration of sulfur and accelerator was increased compared to UR1, UR3, and UR5, respectively, to compensate for the presumed diffusion of the cure ingredients into the ground rubber particles and the resulting consequences of a second-vulcanization in the ground rubber particles and the potential for under-cure of the fresh rubber compound, resulting in a reduced modulus. To solidify the results obtained, tests involving the UR series of compounds were repeated with the results also shown in Table 2 under "Remix".

TABLE 1

Compounds Comprising Ground Rubber

| | UR1 | | UR2 | | UR3 | | UR4 | | UR5 | | UR6 | | Control | |
|---|---|---|---|---|---|---|---|---|---|---|---|---|---|---|
| MB at 50 rpm starting at 100 C. with drop at 3 min or at T = 150 C. | | | | | | | | | | | | | | |
| F3 - MB | 100 | | 100 | | 100 | | 100 | | 100 | | 100 | | 100 | |
| F3-Ground Rubber | 5% | | 5% | | 10% | | 10% | | 20% | | 20% | | | |
| Batch weight (g) | 50 | | 50 | | 50 | | 50 | | 50 | | 50 | | 50 | |
| MB weight (g) | 47.6 | | 47.6 | | 45.5 | | 45.5 | | 41.5 | | 41.5 | | 50 | |
| Ground Rubber weight (g) | 2.4 | | 2.4 | | 4.5 | | 4.5 | | 8.5 | | 8.5 | | 0 | |
| Rubber in MB | 32.8 | | 32.8 | | 31.4 | | 31.4 | | 28.7 | | 28.7 | | 34.5 | |
| Rubber in ground rubber | 1.65 | | 1.65 | | 3.1 | | 3.1 | | 5.8 | | 5.8 | | 0 | |
| Total Rubber (MB + GR) | 34.4 | | 34.5 | | 34.5 | | 34.5 | | 34.5 | | 34.5 | | 34.5 | |
| Finals at 30 rpm starting at 30 C. With drop at 3 min or at T = 90 C. | 0 | | +5 | | +5 | | +10 | | +10 | | +20 | | | |
| Stearic Acid | 2 | 0.66 | 2 | 0.66 | 2 | 0.63 | 2 | 0.63 | 2 | 0.57 | 2 | 0.57 | 2 | 0.69 |
| ZnO | 2 | 0.66 | 2 | 0.66 | 2 | 0.63 | 2 | 0.63 | 2 | 0.57 | 2 | 0.57 | 2 | 0.69 |
| Sulfur | 1.25 | 0.41 | 1.31 | 0.43 | 1.31 | 0.41 | 1.37 | 0.43 | 1.37 | 0.39 | 1.5 | 0.43 | 1.25 | 0.43 |
| TBBS | 0.83 | 0.27 | 0.87 | 0.28 | 0.87 | 0.27 | 0.91 | 0.29 | 0.91 | 0.26 | 1.00 | 0.29 | 0.83 | 0.29 |
| MH | 51.92 | | 52.99 | | 55.09 | | 53.27 | | 51.08 | | 57.02 | | 56.98 | |
| ML | 19.49 | | 19.46 | | 20.91 | | 21.39 | | 23.69 | | 23.68 | | 18.97 | |

Table 1: F3 Master Batch (MB) comprises 100 phr polybutadiene, 40 phr carbon black, and 1 phr antioxidant.

TABLE 2

| Tests Conducted | UR1 | UR2 | UR3 | UR4 | UR5 | UR6 | Control |
|---|---|---|---|---|---|---|---|
| Stress-Strain | | | | | | | |
| 100% Modulus [psi] | 185 | 171 | 174 | 163 | 156 | 128 | 188 |
| | 168 | 161 | 165 | 160 | 157 | 124 | 189 |
| Average | 176 | 166 | 170 | 161 | 157 | 126 | 188 |
| Remix Average | 177 | 190 | 171 | 185 | 184 | 199 | 182 |
| 300% Modulus (psi) | 800 | 709 | 728 | 657 | 625 | 792 | 815 |
| | 690 | 638 | 672 | 631 | 641 | 766 | 801 |
| Average | 745 | 674 | 700 | 645 | 633 | 779 | 809 |
| % of control | 92 | 83 | 86 | 80 | 78 | 96 | 100 |
| Remix Average | 755 | 813 | 714 | 788 | 777 | 841 | 789 |
| Tensile Strength (psi) | 1331 | 1040 | 1187 | 1182 | 885 | 1078 | 1695 |
| | 1314 | 1299 | 1165 | 1018 | 961 | 1025 | 1835 |
| Average | 1323 | 1169 | 1176 | 1100 | 923 | 1051 | 1765 |
| % of control | 75 | 65 | 57 | 62 | 52 | 60 | 100 |
| Remix Average | 1415 | 1368 | 1228 | 1279 | 1047 | 1126 | 1986 |
| Elongation at Break (%) | 409 | 378 | 404 | 427 | 365 | 359 | 487 |
| | 439 | 451 | 414 | 398 | 382 | 354 | 523 |
| Average | 424 | 415 | 409 | 412 | 373 | 357 | 505 |
| % of control | 84 | 82 | 81 | 82 | 74 | 71 | 100 |
| Remix Average | 443 | 414 | 413 | 402 | 359 | 358 | 539 |
| Normalized Tensile Quality [%] | | | | | | 41 | 100 |
| Solvent Swelling (in Toluene) | | | | | | | |
| $W_{oxidative}/W_{dry}$ | 3.77 | 3.97 | 4.02 | 3.97 | 4.45 | 3.9 | |

As indicated by Table 2, a decrease in tensile strength of about 25% results when only 5 phr of vulcanized ground rubber is added, while a decrease in tensile strength of approximately 30% results from the addition of 10 phr. The addition of 20 phr of vulcanized ground rubber decreases the tensile strength by almost 50%. When commercially obtained cryogenically ground rubber particles of the same mesh size, but of unknown composition were incorporated (10 and 20% level) into the same F3 compound, very similar performance losses were measured. These results indicate that an addition of vulcanized ground rubber, even under ideal conditions where the compositions are identical and where the vulcanized ground rubber has not been subjected to heat and/or oxidative environments, will have a substantial deleterious effect on the physical properties of the cured rubber compound. It is thus believed that the primary cause of performance losses encountered in the recycling of cured rubber particles cannot be wholly attributed to the earlier mentioned differences in composition, as well as heat and oxidation induced structural changes, but must have other causes. Recent studies have identified significant additional crosslinking taking place in the vulcanized ground rubber particles during the curing of the final rubber composition and have found insufficient bonding of the vulcanized ground rubber particles to the fresh rubber compound to which they were added. These deficiencies appear to be the main cause of the reported losses in performance with the results obtained now being discussed.

An experiment was carried out to identify and measure the additional crosslinking that occurs as a result of inter-diffusion of cure additives into recycled rubber. The experiment was designed to simulate the environment in which ground recycled rubber is embedded in a fresh rubber compound during curing. In the experiment, vulcanized F3 rubber sheets were placed on top of 2 mm thick sheets of EPR (ethylene/propylene/copolymer) gum rubber that contained a small concentration of various additives typically used to induce the curing of rubber, including sulfur and cure accelerators, such as TBBS, zinc oxide, and stearic acid. The cure additives induce additional crosslinking only in the previously vulcanized rubber layer due to the saturated structure of the EPR layer. The layers were placed in molds, compressed, and exposed to temperatures of 160 degrees Celsius for 25 minutes, a typical temperature for curing. The EPR layer was subsequently peeled off and stress strain tests were performed on the treated rubber layer using micro-dumbbells. The 50% and 100% moduli were used as a relative measure of crosslink density.

Figure 4:
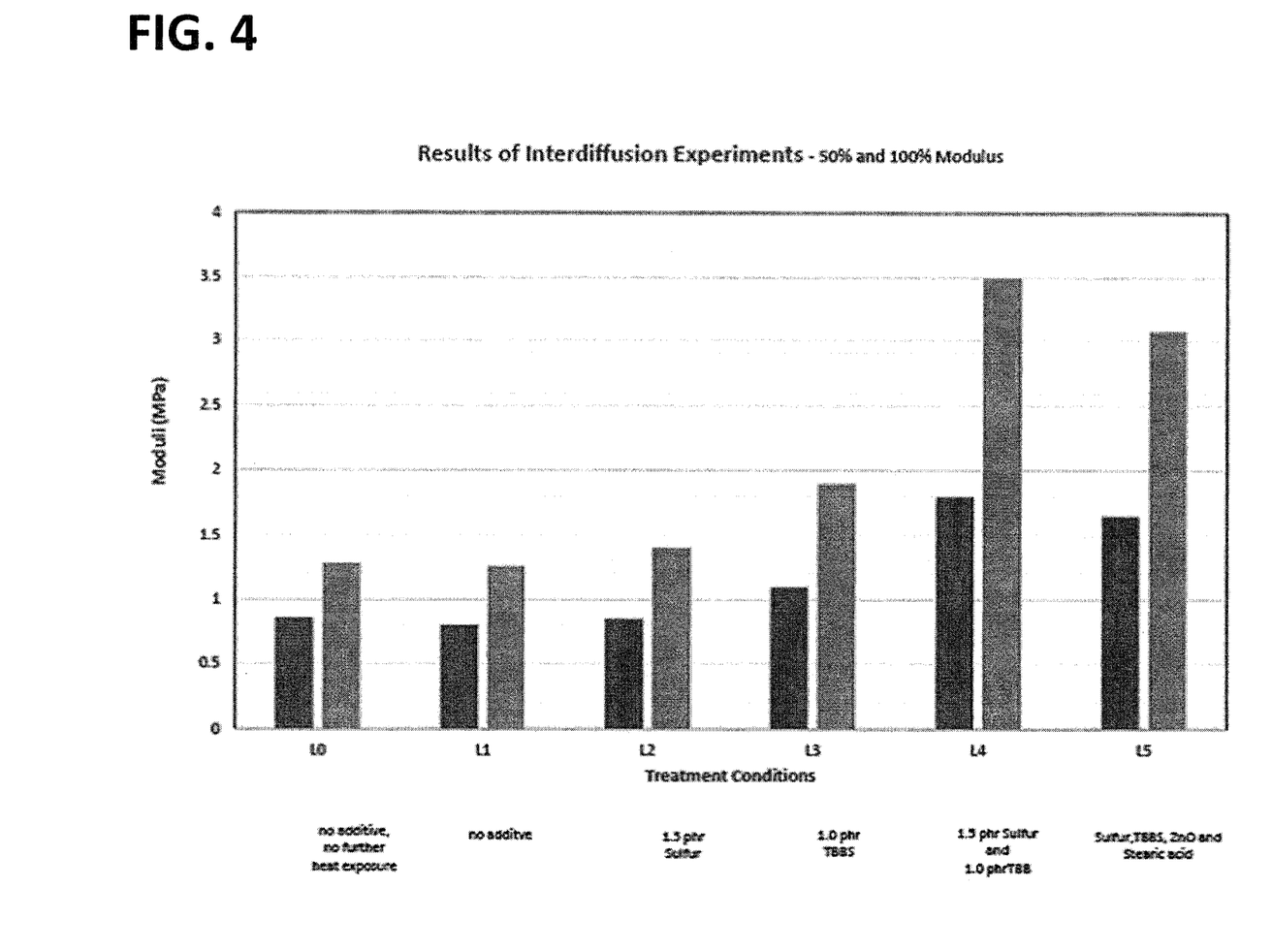
FIG. 4 is a graphical representation of the treatment condition versus moduli results from inter-diffusion experiments.

The results of the experiment are set forth in FIG. 4. The results of the experiment show that the addition of heat exposure alone L1 does not result in a change in modulus relative to the L0 control, but small increases in modulus occurred with the addition of sulfur L2. Greater increases were realized with the inter-diffusion of the TBBS cure accelerator alone, and increases greater than 100% occurred in the L4 and L5 laminates, in which a combination of sulfur and a cure accelerator were added. These results show that the addition by inter-diffusion of cure accelerating ingredients during the vulcanization process increases the number of crosslinks within the rubber. Similar increases in moduli would be expected to be induced in ground rubber particles during the second vulcanization of the recycled rubber. In light of the results of this experiment, there is a need for a method to prevent additional crosslinking in previously vulcanized ground rubber particles as a result of interdiffusion of cure inducing additives during the processing and curing with a fresh rubber compound.

Laminate experiments can also be used to explore the degree of bonding achieved between recycled rubber and fresh rubber compound. The degree of bonding can critically affect the physical properties of the cured composites. In one particular experiment, a cured and an uncured rubber sheet, both 25 mm in width and backed with a 1.5 mm thick reinforced rubber layer, were co-vulcanized at 160° C. for 20 minutes in a mold under pressure. A 30 mm long thin Mylar film was placed between the two sheets on one end to prevent bonding in that area. Following co-vulcanization, this area easily separated and allowed clamping of the two ends in a tensile tester which was utilized to measure the peel force required to separate the two layers of the composite. A second Mylar film was placed between the two uncured sheets of laminates UU-1 and UU-2, for which high peel strength was expected. The second Mylar film had a 0.125" window that limited contact between the two uncured rubbers within the narrow window. The results are set forth in Table 3 below.

TABLE 3

Peel Strength Data from Initial Laminate Testing

| Sample | Insert (0.125" wide) | Sep. Rate (inch/min) | Backing Cord Orientation | Avg. Peel Force (lb) | Avg. Peel Strenght (lb/inch) | Peak Peel Strength (lb/inch) | Comments |
|---|---|---|---|---|---|---|---|
| UU-1 | yes | 0.5 | ok | 26.8 | 204 | 214 | Used plastic insert with narrow slot |
| UU-2 | yes | 2.0 | wrong | 25 | 200 | 273 | Used plastic insert with narrow slot |
| UU-3 | no | 2.0 | wrong | | | | Used plastic insert with narrow slot tore through at 50 lb force |
| UC-4 | no | 2.0 | ok | | 4.9 | 6.8 | |
| UC-5 | no | 2.0 | wrong | | 5.7 | 7.6 | |
| UC-6 | no | 2.0 | ok | | 5.0 | 6.4 | |

The results show that the peel strength in laminates made from two uncured sheets (UU-1 and UU-2) was over 200 lb/inch. In stark contrast, laminates assembled from a cured and uncured sheet had a peel strength of about 5 lb/inch, indicating poor interphase bonding between the cured and uncured sheet. Changing the cord orientation of the backing layer had little effect on the peel strength of the laminates assembled from the cured and uncured rubber sheets, as would be expected under the experimental conditions. A vulcanized ground rubber particle co-vulcanized with a fresh rubber compound will experience very similar temperature, pressure and time exposure, and is thus expected to also show poor interphase bonding.

Thus, a need exists in the art for a method of recycling vulcanized rubber that does not require devulcanization of the previously cured recycled rubber prior to reprocessing/curing the recycled rubber with fresh rubber compound, thereby eliminating the often complex devulcanizing step of the rubber recycling process, decreasing operational costs and avoiding harmful structural modifications to the rubber molecules of the ground rubber particles. In addition, a need exists in the art for a method of recycling vulcanized ground rubber which provides the ability to mix an increased concentration of vulcanized ground rubber with fresh rubber compound prior to reprocessing/curing that provides comparable or increased material performance in the final product compared to prior art rubber recycling methods. A need exists in the art for a method of recycling vulcanized ground rubber which is capable of optimizing desired characteristics of the rubber end product. The rubber recycling method of the present invention satisfies those needs, and will now be described.

BRIEF SUMMARY OF THE INVENTION

An objective of the present invention is to provide a method of recycling rubber that does not require devulcanization of the previously cured rubber prior to reprocessing/curing the recycled rubber with fresh rubber compound.

Another objective of the present invention is to provide a method of recycling rubber with decreased operational costs.

Yet another objective of the present invention is to provide a method of recycling rubber that avoids harmful structural modifications to the rubber molecules of the vulcanized ground rubber particles.

Still another objective of the present invention is to provide a method of recycling rubber that enables the ability to mix an increased concentration of recycled rubber with fresh rubber compound prior to reprocessing/curing that provides comparable or increased material performance in the final product.

Still yet another objective of the present invention is to provide a method of recycling rubber that is capable of imparting selected unique performance characteristics in the rubber end product by incorporating certain functional groups, chemicals, or compounds near the surface or within the interior of the vulcanized ground rubber particles treated and/or coated in accordance with the rubber recycling method of the present invention.

These objectives and others are achieved by the rubber recycling method of the present invention, which includes grinding a vulcanized rubber compound into a plurality of particles, treating the plurality of particles with at least one chemical curing agent inhibitor, mixing the plurality of particles with a fresh rubber compound, and co-vulcanizing the mixture of the plurality of particles and the fresh rubber compound.

These objectives and others are also achieved by the rubber recycling method of the present invention, which includes grinding a vulcanized rubber compound into a plurality of particles, encapsulating each one of the plurality of particles in an adhesion promoting layer, mixing the encapsulated plurality of particles with a fresh rubber compound, and co-vulcanizing the mixture of the plurality of particles and the fresh rubber compound.

These objectives and others are also achieved by the rubber recycling method of the present invention, which includes grinding a vulcanized rubber compound into a plurality of particles, encapsulating each one of the plurality of particles in an adhesion promoting layer or treating the plurality of particles with at least one chemical curing agent inhibitor, and utilizing the encapsulated or treated plurality of particles as a building block for designing particles that can impart selected properties to a rubber stock.

BRIEF DESCRIPTION OF THE SEVERAL VIEWS OF THE DRAWINGS

The exemplary embodiments of the present invention, illustrative of the best mode in which Applicant has contemplated applying the principles of the present invention, are set forth in the following description and are shown in the drawings.

DETAILED DESCRIPTION OF THE INVENTION

In the rubber recycling method of the present invention, previously sulfur-vulcanized compounds diminuated into tire buffings during re-treading or converted into small particles by grinding or shaving the rubber of a whole tire as part of a tire recycling operation are: 1) micro-encapsulated with a thin rubber layer and/or 2) treated with one or more cure inhibiting chemicals, both of which prevent or significantly reduce the occurrence of a second vulcanization of the recycled rubber upon mixing and reprocessing/curing with fresh rubber compound and improve the dynamics of wetting and bonding to the recycled rubber. A first exemplary embodiment rubber recycling method 10 and a second exemplary embodiment rubber recycling method 110 in accordance with the rubber recycling method of the present invention, include the steps shown in FIG. 2, and are generally depicted in FIG. 3, as well as described below.

Figure 2:
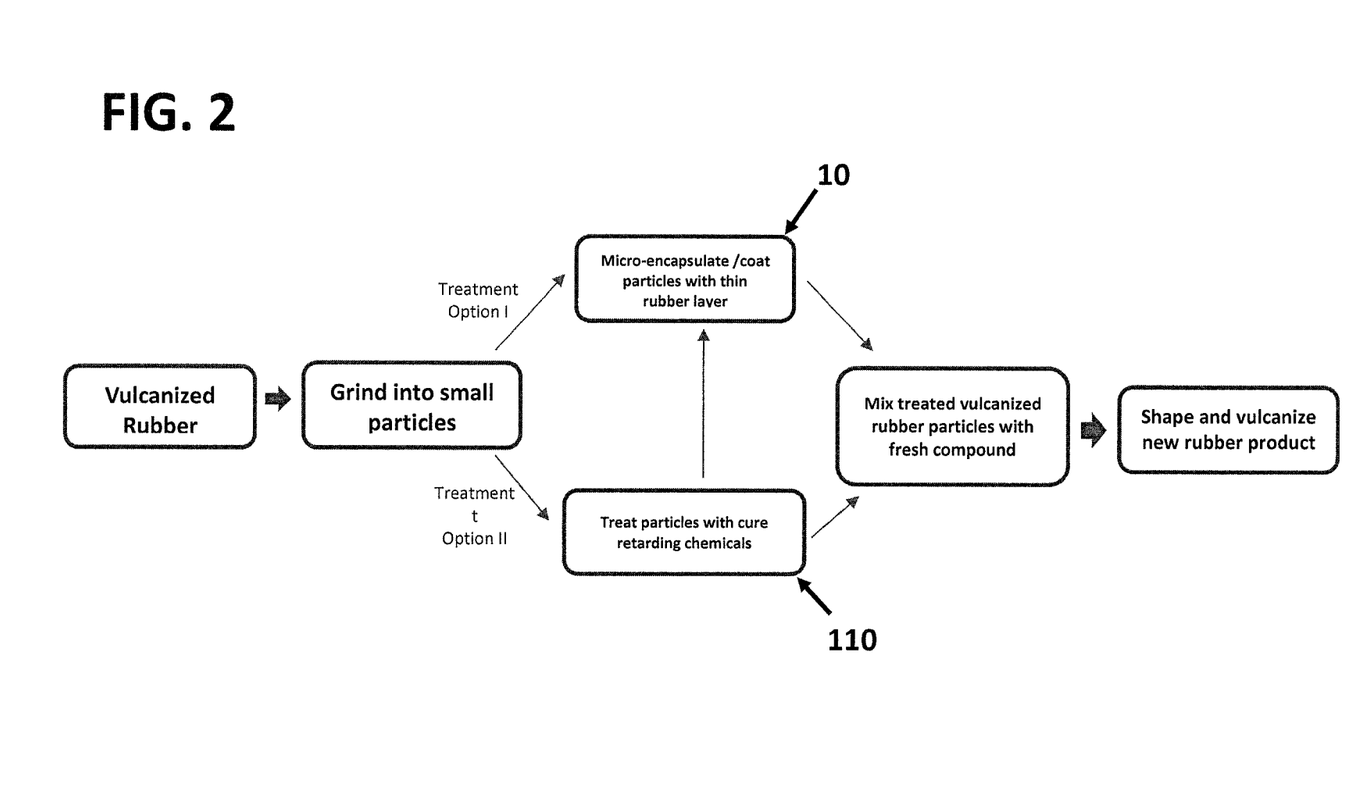
FIG. 2 is a schematic representation of the first and second exemplary embodiment rubber recycling methods of the present invention.
Figure 3:
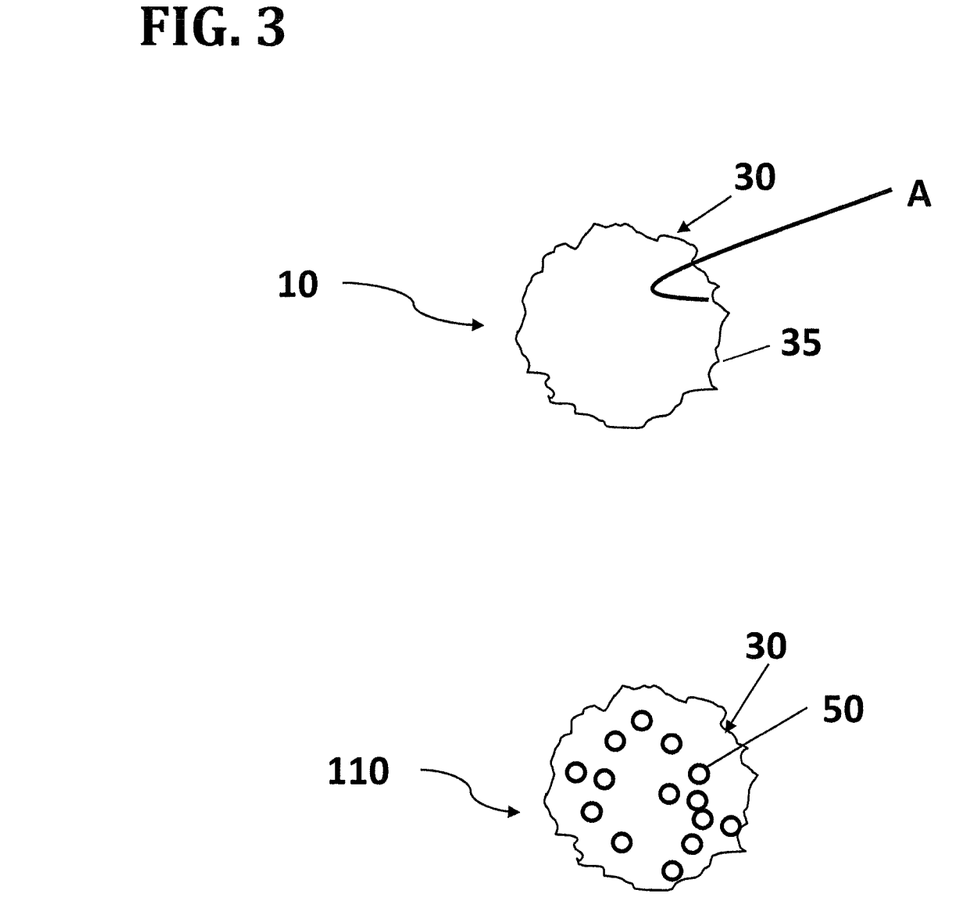
FIG. 3 is a pictorial representation of the coating/encapsulation and/or treatment steps of the first and second exemplary embodiment rubber recycling methods of the present invention that significantly reduce or prevent additional crosslinking in the ground rubber during recycling and promote the bonding of the ground rubber particles to the fresh rubber compound.

With reference to FIGS. 2-3, in first exemplary embodiment rubber recycling method 10, the vulcanized ground rubber particles 30 are coated with a thin rubber surface layer 35 to which other rubber compounds can be easily and strongly bonded by co-vulcanization. This can be accomplished when the coating layer is strongly bonded to the surface of the ground rubber particles 30, for example, by intramolecular chemical crosslinks, while the bulk of the layer, and particularly the side that is to face and co-vulcanize with the host rubber compound, remains essentially uncrosslinked. This can be accomplished by at least two different approaches, including microencapsulation with intermolecular crosslinking and by microencapsulation involving reactive grafting;

a) Microencapsulation with Intermolecular Crosslinking

In this approach, a thin adhesion promoting layer 35 is applied to the surface of the vulcanized ground rubber particles 30 by one of many techniques developed for a range of coating applications. Bonding of the layer to the surface of the vulcanized ground rubber particles is achieved by facilitating molecular interpenetration and subsequent intermolecular chemical crosslinking between the rubber molecules of the applied layer and the rubber molecules in the outer layer of the cured rubber particles. Achieving a good bond of the coating layer to the vulcanized ground rubber particles 30 is not only important to achieve good physical properties in the final product to which the vulcanized ground rubber is to be added, but also to make sure that the new adhesion promoting surface layer is not significantly interfered with or all together removed by the shear force that all new rubber compounds experience during one or more mixing and processing steps before being vulcanized.

Later, when these coated, or encapsulated, ground rubber particles 30 are added to host fresh rubber compounds ("the recycling process"), good bonding to the fresh host rubber compound will be achieved during the curing of the rubber product. In the interest of achieving good thermodynamic compatibility between the vulcanized ground rubber particles and the host fresh rubber compound, the major component of the adhesion promoting layer 35 will be made of one or more unsaturated rubbers, such as Natural Rubber, polyisoprene, polybutadiene, poly(butadiene-co-styrene), as the composition of a typical ground rubber particle generated from spent tires is composed of a blend of one or more unsaturated rubbers. Beneficial additives can also be introduced into the composition of the coating layer. Some of the additives used in the coating layer may be chemicals (solvents, oils, and the like) that can swell the surface of the ground rubber particles and thus facilitate interpenetration of the rubber molecules into the cured dense matrix. The purpose of other additives will be to induce inter-molecular chemical crosslinking between the interpenetrating molecules and the molecules of the cured ground rubber particle matrix under conditions, at temperatures, and at rates that will result in optimum bonding. In the case of sulfur crosslinking, the additives may be sulfur, one or more cure accelerators, including ultra-accelerators that facilitate fast crosslinking, as well as lower temperature crosslinking, and cure promoters, such as zinc oxide, stearic acid etc. In the case of carbon/carbon crosslinking, one could draw on peroxides and other crosslinking agents. Additional additives may also be added to aid the coating process, such as rheology tuning chemicals, chemicals to promote tack, etc. Micro and/or macrostructure changes in the coating rubber could facilitate this process. For example, the polybutadiene could contain a short end block of 1,2 vinyl unsaturations that have a greater reactivity toward crosslinking, and thus when these rubbers interdiffuse into the swollen surface layer of the ground rubber particles, they are likely to form a larger percentage of intermolecular crosslinks with the matrix polymers. The formation of intermolecular crosslinking could also be promoted by functional groups. The rubber composition of the coating layer can also contain reinforcing agents, such as carbon black, or other additives that promote microencapsulation.

The microencapsulation process can be achieved via physical methods, such as suspension coating or spray drying, or physicochemical methods, such as coacervation phase separation. In one often used microencapsulation process, the particles to be coated are suspended and stirred in a liquid suspending medium, such as water. The rubber composition of the coating layer is dissolved in an organic solvent that is not soluble in the suspending medium, and is then gradually added to the suspending medium where it will coat out on the surface of the particles.

Successful application of first exemplary embodiment rubber recycling method 10 requires that special attention be given to the optimum design of two key interfaces, an interface A and an interface B (not shown). Interface A exists between the vulcanized ground rubber surface and the new rubber layer 35 being applied by microencapsulation. Interface B exists between the outer surface of the new rubber layer 35 and the rubber molecules of the fresh rubber compound (not shown). At interface A, the new rubber layer 35 that coats the vulcanized ground rubber surface not only has to be partially crosslinked to have sufficient integrity to withstand shear forces it will be exposed to during later mixing and processing steps, but also has to wet and partially inter-diffuse into the network of the cured particles and chemically bond to these network molecules by intermolecular crosslinking. A light random crosslinking induced by peroxides, for example, should meet these requirements. This approach might be aided by sequentially applying two or more thin layers, with each layer containing different concentrations of crosslinking agents. For example, the first layer directly attached to the vulcanized ground rubber could be designed to generate a significant concentration of intermolecular crosslinks with the vulcanized ground rubber particle 30 surface, while additional layers would be designed to have a lower crosslink density to achieve strong bonding to the fresh rubber compound at interface B during vulcanization. Because the fresh rubber compound is uncured and the outer surface of the coating layer 35 would have a low crosslink density, the two rubbers are expected to easily inter-diffuse and form strong bonds, as is typically observed when two uncured rubbers are being combined by co-vulcanization. A strong bonding of the new rubber layer to the vulcanized ground rubber surface at interface A could also be accomplished by reactions of special functional groups on the coating rubber with, for example, unsaturations of the vulcanized ground rubber network.

In order to separately control the changes at the interfaces A and B, it can be helpful to imbibe the vulcanized ground rubber particles with a fluid that will significantly swell the particle prior to the encapsulation step. When chemicals are added to this fluid, the chemicals will be transferred into the vulcanized ground rubber particle and can be made to stay in the particle even after the fluid is removed in a later step by vaporization or by other means. In that way it will, for example, be possible to induce rapid intermolecular sulfur crosslinking of the rubber molecules of the later added coating with molecules of the cured rubber matrix of the vulcanized ground rubber particles through the addition of fast accelerators. Depending on the selection of the accelerator(s), sulfur may not need to be added to achieve crosslinking, as some accelerators may contribute sulfur (sulfur donor accelerators) or can free sulfur from existing polysulfidic crosslinks. In this approach, the adhesion promoting coating becomes chemically bonded to the vulcanized ground rubber particles through intermolecular crosslinks in the interphase, while little or no crosslinking occurs outside the interphase. This leads to a co-vulcanization of two essentially uncured rubbers at interphase B, assuring good bonding between the outer surface of the new rubber layer and the host fresh rubber compound.

Figure 1:
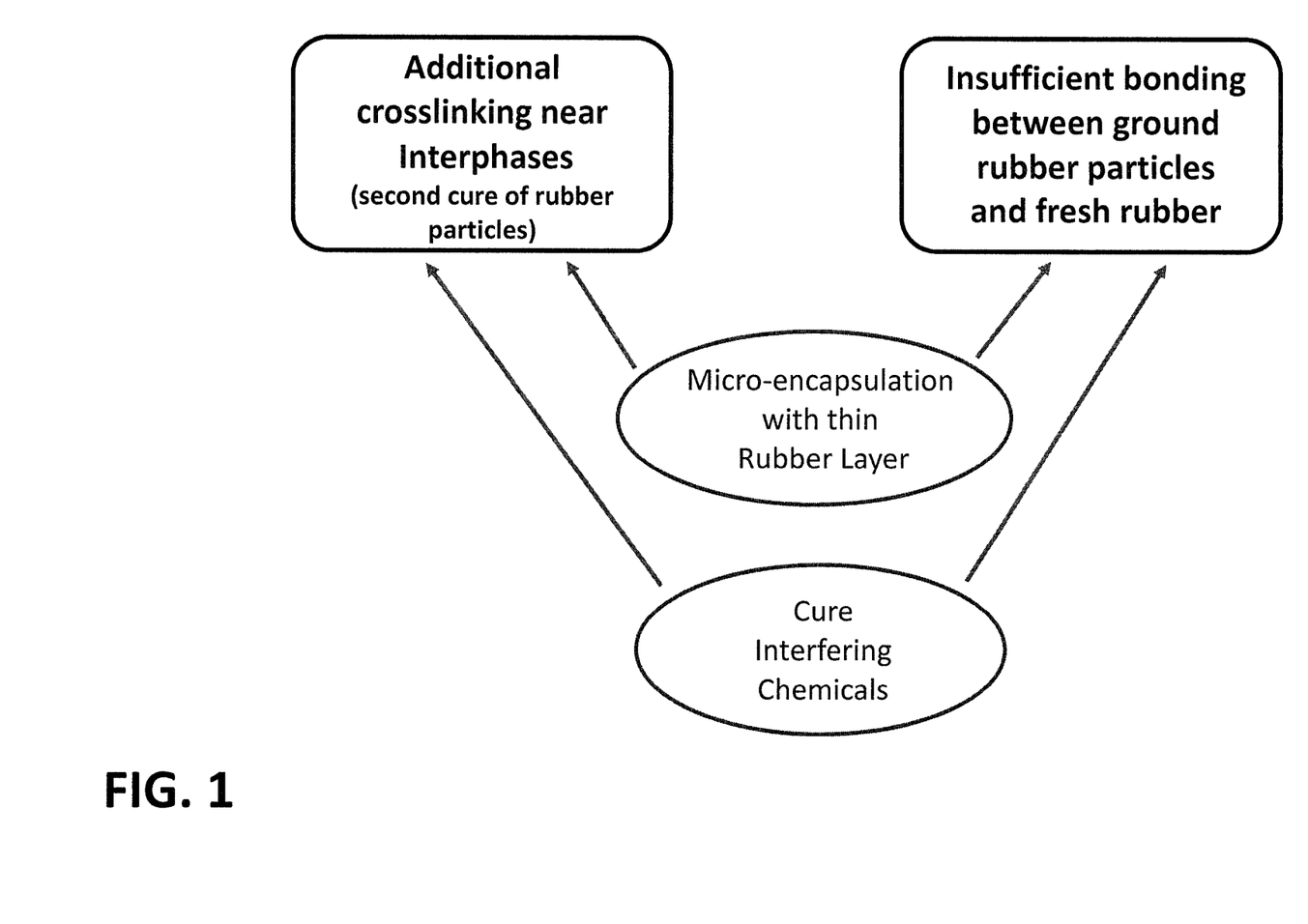
FIG. 1 is a schematic representation of the two main problems associated with rubber recycling and the solutions for each offered by the first and second exemplary embodiment rubber recycling methods of the present invention.

Moreover, the thin coating layer will also represent a buffer into which sulfur and accelerator can diffuse and react to form new crosslinks without causing excess crosslinking in the outer portion of the vulcanized ground rubber particles 30. The microencapsulation method of first exemplary embodiment rubber recycling method 10 via intermolecular crosslinking can thus address both of the two problems associated with current rubber recycling processes described above and shown in FIG. 1, including additional crosslinking near interphases and insufficient bonding between the vulcanized ground rubber particles and fresh rubber compound.

b.) Microencapsulation by Reactive Grafting

Alternatively, microencapsulation can be achieved by reactive grafting. Here the bonding between the applied thin rubber layer and the vulcanized ground rubber particles is achieved by a reaction of functional groups on the rubber molecules used in the coating layer with either the rubber of the vulcanized ground rubber particles or with reactive groups added to the vulcanized ground rubber surface by some pretreatment. The microencapsulation method of first exemplary embodiment rubber recycling method 10 via reactive grafting also addresses the two problems associated with current rubber recycling methods described above and shown in FIG. 1, including additional crosslinking near interphases and insufficient bonding between the vulcanized ground rubber particles and fresh rubber compound.

With continued reference to FIGS. 2-3, in the second exemplary embodiment rubber recycling method 110 of the present invention, a vulcanized ground rubber compound, for example from a tire, is ground or shaved into a fine mesh to form a plurality of particles 30 and the vulcanized ground rubber compound is then treated with a mixture of at least one chemical curing agent inhibitor 50 and a solvent, including solvents, oils, and the like, which is capable of solubilizing the chemical curing agent inhibitor, swelling the vulcanized ground rubber compound, and dispersing the chemical curing agent inhibitor within the vulcanized ground rubber. It should be understood that the transfer of the curing agent inhibitor 50 into the vulcanized ground rubber 30 can also be accomplished by means not involving the use of solvents. For example, one can tumble the vulcanized ground rubber with the chemical curing agent inhibitor in suitable mixing type equipment and rely on some shear in addition to diffusions in order to achieve the necessary penetration. In another example, the chemical curing agent inhibitor 50 could be bonded to vulcanized ground rubber 30 via suitable functional groups attached to the chemical curing agent inhibitor which reacts with the double bonds of the vulcanized ground rubber. However, given that many potentially useful cure inhibitors are polar and not soluble in the rubber of choice, the solvent approach described above is the preferred process in most cases. The chemical curing agent inhibitor is selected to significantly interfere with or completely eliminate any second cross-linking of the vulcanized ground rubber during a subsequent curing. More specifically, the chemical curing agent inhibitor is a chemical that reacts with one or more of the cure inducing chemicals that either remained active from the first vulcanization step when the tire was initially produced or have diffused into the vulcanized ground rubber particles during the mixing and later vulcanization with a fresh rubber compound. After treating the vulcanized ground rubber particles with the chemical curing agent inhibitor, the vulcanized ground rubber is then mixed with fresh rubber compound. The mixture of vulcanized ground rubber and fresh rubber compound is then reprocessed and subsequently vulcanized. Alternatively, the second exemplary embodiment rubber recycling method 110 could also be combined with the first exemplary embodiment rubber recycling method 10 without changing the overall concept or operation of the present invention.

Various chemical curing agent inhibitors could be utilized to achieve the desired inhibition of the second-vulcanization as described above. In one approach, the vulcanized ground rubber particles could be treated with a chemical curing agent inhibitor which interferes with or inhibits the functionality of the selected cure accelerator. For example, and with reference to amine and amide type accelerators, because most amine or amide accelerators used in the tire industry are nucleophiles, the chemical curing agent inhibitor could include an electrophilic structure such as an organic acid, an aldehyde, alkyl halide, or other similar structure, to induce reactions that will render the accelerator inactive.

In another approach, the vulcanized ground rubber particles could be treated with a chemical curing agent inhibitor that reacts with or inhibits sulfur, such that the concentration of active sulfur is depleted or incapable to react with the accelerator to form additional sulfur cross-links between vulcanized ground rubber molecules.

Turning now to Table 4, the results of experiments performed to identify and measure the degree to which organic acids and some other chemicals will reduce or completely inhibit the cure accelerator from contributing to the formation of additional crosslinks are shown.

TABLE 4

| Additive | Max. Torque (Lbf · inch) | Min. Torque (Lbf · inch) | ΔTorque (lbf · inch) | Scorch Time (min) | Time to reach 50% cure (min) | Time to reach 90% cure (min) |
| --- | --- | --- | --- | --- | --- | --- |
| No additive | 49.09 | 17.83 | 31.26 | 6.07 | 10.27 | 15.68 |
| Dibutyl phosphate | | | | | | |
| 1 phr | 43.28 | 14.19 | 29.09 | 7.01 | 13.9 | 20.82 |
| 3 phr | 28.23 | 13.13 | 15.10 | 7.71 | 13.59 | 22.79 |
| Bis(2-ethylhexl)phosphate | | | | | | |
| 1 phr | 43.61 | 14.06 | 29.55 | 6.63 | 12.42 | 18.69 |
| 3 phr | 31.70 | 12.55 | 19.15 | 6.61 | 19.39 | 27.02 |
| p-Xylene-2-sulfonic acid hydrate | | | | | | |
| 1 phr | 33.04 | 14.09 | 18.95 | 5.47 | 14.31 | 24.80 |
| 3 phr | 25.24 | 13.52 | 11.72 | 7.06 | 13.85 | 24.43 |
| Linoleic Acid | | | | | | |
| 1 phr | 43.71 | 14.48 | 29.23 | 6.09 | 12.47 | 20.06 |
| 3 phr | 40.10 | 13.44 | 26.66 | 6.46 | 14.38 | 23.26 |

In the experiments, a stock of fresh carbon black reinforced rubber including 100 parts per hundred rubber (phr) of polybutadiene rubber and 40 phr carbon black containing 1 phr antioxidant and cure reagents including 2 phr stearic acid, 2 phr zinc oxide, 1.25 phr sulfur, and 0.83 phr N-tert-butyl-2-benzothiazyl sulfonamide, or TBBS, cure accelerator was prepared. Portions of the stock were then mixed with 1 or 3 phr of the listed chemicals for three minutes at a temperature below 80 degree Celsius to avoid premature vulcanization. The cure rate of the resulting compounds was subsequently tested with an oscillating disc rheometer that recorded torque changes induced by the vulcanization process. This was to determine the effect of the cure inhibitors 1-4 on changes in cure rate (observed by Tc90 which is the time in minutes to reach 90% of the achievable cure) and the degree of cure achieved (observed by the difference in the maximum torque (MH) recorded (at end of cure) and the minimum torque (ML) measured prior to the onset of vulcanization.

Unlike the cure of the control stock which did not contain any cure inhibitor, some of the cure inhibitor containing compounds greatly delayed the onset of vulcanization and significantly reduced the degree of cure. As shown in Table 4, a treatment of the rubber compound with 3 phr of the inhibitors 1-4 resulted in a 14.7-62.6% reduction in cure (crosslink density), as opposed to 5.5 to 39.4% with a 1 phr concentration. The best performing cure inhibitors were p-xylene-2-sulfonic acid hydrate and bis(2-ethylhexyl) phosphate, which increase the time to reach 90% cure by nearly 60% for bis(2-ethylhexyl) phosphate and upwards of 60% for p-xylene-2sulfonic acid hydrate.

A further experiment was conducted to determine the transfer and retention of bis(2-ethylhexyl) phosphate in cured rubber, the results of which are set forth in Table 5 below.

TABLE 5

Toluene Swelling of F3 samples and the Transfer and Retention of Bis(2-ethylhexylphosphate)-0.153M EHP in toluene

| Sample | $W_d°$ Dry weight before swelling (g) | $W_s°$ Swollen weight after 22 hours (g) | $W_s°/W_d°$ | $W_d$ after drying for 27 hours (g) | AW = $W_d°-W_d$ (mg) | AW* = $W_d°-W_d$ (%) | $W_s^s$ in (0.15M) EHP toluene solution (0.49 g EMP/10 g toluene) (g) | $W_d^s$ dried after 7 hours (g) |
|---|---|---|---|---|---|---|---|---|
| L1-0 | 0.270 | 1.018 | 3.77 | 0.259 | 11 | 4.1 | 0.99 | 0.273 |
| L2-s | 0.307 | 1.024 | 3.34 | 0.298 | 9 | 2.9 | 1.005 | 0.309 |
| L3-TBBS | 0.320 | 1.042 | 3.26 | 0.311 | 9 | 2.8 | | |
| L4-S + TBBS | 0.178 | 0.456 | 2.56 | 0.175 | 3 | 1.7 | | |
| L5 | 0.228 | 0.573 | 2.51 | 0.225 | 3 | 1.3 | | |
| Comments | | | | | | | After 4 hours in solution | |

| Sample | $W_d^s$ dried after 24 hours (g) | $W_s°-W_d^s$ weight of solvent in sample (mg) | EHP in sample if 100% retained after drying | $W_d^s-W_4$ Actual EHP Retained (%) | *4.81% of the original sample (mg) | 50% Moduli (MPa) | 100% Moduli (MPa) |
|---|---|---|---|---|---|---|---|
| L1-0 | 0.273 | 14 | 33 | 42.4 | 12.9 | 0.8 | 1.26 |
| L2-s | 0.309 | 11 | 32.5 | 33.8 | 14.8 | 0.85 | 1.4 |
| L3-TBBS | | | | | 15.4 | 1.1 | 1.9 |
| L4-S + TBBS | | | | | 8.6 | 1.8 | 3.5 |
| L5-All | | | | | 11.0 | 1.65 | 3.08 |
| F3 from UR Set | | | | | | 0.86 | 1.29 |

*The F3 compound contains 0.85% sulfur, 0.56% TBBS, 1.36% ZnO, 1.36% Stearic acid and 0.68% AO (antioxidant)-all together 4.81% of which only a fraction is extractable after vulcanization The 2 mm thick cured sheets L1 and L2 sample rubber from the previous experiment (Table 5) were used. First, to remove any solvent miscible ingredients the samples were soaked in toluene at room temperature for seven hours until no further increases in solvent swollen weight were measured to remove any solvent miscible ingredients. After drying the weight reduction resulting from the toluene treatment was 4.1% for L1 and 2.9 for L2. The reduction in weight is presumably due to the removal of some unreacted cure ingredients. The samples were then soaked in a 0.153 M toluene solution of bis(2ethylhexyl) phosphate (EHP) until no further increases in swollen weight were measured, after which the sample was dried. Sample L1, which had not been exposed to any sulfur inter-diffusion retained 42.4% of the EHP after drying while sample L2 retained 33.8%. The level of EHP retained by L2 will, as expected, be somewhat lower due to its somewhat higher crosslink density. The results clearly show that significant concentrations of bis (2ethylhexyl) phosphate can be transferred and retained in the cured rubber by this procedure where it could later be used to inhibit additional crosslinking caused by an inter-diffusion of cure inducing agents.

It is believed that the selected organic acids modify the TBBS accelerator, thus rendering the accelerator ineffective, resulting in increased cure time of the rubber and a significant lowering of the maximum cross-link density, or cure level, of the treated rubber. It is proposed that when vulcanized ground rubber is treated with an organic acid and then mixed and reprocessed with fresh rubber compounds, a similar inhibition will occur during vulcanization, which can minimize or totally prevent a second cure in the vulcanized ground rubber depending on the inhibitor chosen and the inhibitor concentration. The results also suggest that the structural optimization of a cure inhibitor, regardless whether designed to interfere with the accelerator or the sulfur, will not only optimize the prevention of a second cure in the recycled rubber but also will simplify the recycling process and its economics. It is anticipated that this will involve the introduction of structural features that help to compatibilize the cure inhibitor with the mostly non-polar ground rubber phase it is to be embedded in and also facilitate controlling its mobility in the ground rubber particles. Cure inhibitor transferred in the above described manner will remain mobile in the rubber but such motion could be arrested if the inhibitor is synthesized with a reactive group (for example R-SH) that can react with the unsaturation of the rubber molecules. Immobilizing such cure inhibitors after transfer to the ground rubber by inducing the above referred to reaction in the particles could help to control the reaction dynamics and prevent its diffusion out of the particles.

Thus, the second exemplary embodiment rubber recycling method 110 addresses the two problems associated with current rubber recycling methods described above and shown in FIG. 1, including additional crosslinking near interphases and insufficient bonding between the vulcanized ground rubber particles and fresh rubber compound.

Rubber recycling methods 10,110 of the present invention thus eliminate the need to devulcanize the vulcanized ground rubber prior to reprocessing/curing the mixture of the vulcanized ground rubber and fresh rubber compound, thereby eliminating an often complex step of recycled rubber devulcanization prior to mixing with fresh rubber compound and decreasing operational costs. Rubber recycling methods 10,110 of the present invention also allow a greater percentage of vulcanized ground rubber to be utilized in the rubber recycling process, while avoiding harmful structural modifications to the rubber molecules of the vulcanized ground rubber particles and providing a recycled rubber product with comparable or increased performance to that of prior art rubber recycling methods.

In addition, rubber recycling methods 10,110 of the present invention also provide a method of recycling rubber that is capable of imparting selected, unique, performance-improving characteristics to a rubber end product. Generally, when improvements to rubber end products are desired, the best results are often achieved by considering both the functionality and the structure of any performance enhancing material as well as the underlying mechanism by which these improvements can be generated. Rather than just adding such materials to the bulk fresh rubber matrix it is often advantageous to assemble the key performance improving elements on a microscale building block that can facilitate an assembly of the functional elements in a preferred arrangement, size, and shape, and such building blocks are then added to the rubber compound. Ground rubber particles coated and/or treated in accordance with recycling methods 10,110 of the present invention can also be utilized as such building blocks wherein performance enhancing additives, chemicals, or macromolecules can be incorporated near the surface or within the interior of the vulcanized ground rubber particles. For example, vulcanized ground rubber particles coated and/or treated in accordance with recycling methods 10,110 could be utilized to design rubber based end products in which the propagation of micro-cracks, which are often responsible for stress-induced rubber failure, are greatly impeded. More specifically vulcanized ground rubber particles could be coated and/or treated in accordance with rubber recycling methods 10,110 to include features that enable the vulcanized ground rubber particles to act as barriers or as energy dissipating domains which impede propagation of micro-cracks. For example, the vulcanized ground rubber particles could be coated and/or treated in accordance with rubber recycling methods 10,110 to include strain crystallizing macromolecules, such as cis polyisoprene, grafted onto the vulcanized ground rubber particles, such that the vulcanized ground rubber particles would be decorated with brush-like structures of defined shape and dimension that could act as barriers to prevent the advancement of micro-cracks in the end product. The vulcanized ground rubber particles could also be coated and/or treated in accordance with rubber recycling methods 10,110 to include regions of very low crosslink density at the core or at an outer layer such that the vulcanized ground rubber particles can dissipate high stresses present near the tip of an advancing crack and thus improve the end product.

It is contemplated that rubber recycling methods 10,110 of the present invention could suppress the concentration of sulfur cross-links formed as a result of the second vulcanization of the vulcanized ground rubber to less than 20 percent of the assumed 100 percent, of the typical prior art rubber recycling methods. It is contemplated that rubber recycling methods 10,110 of the present invention could utilize different chemical curing agent inhibitors and coatings than those disclosed, including those that inhibit different curing agents than those disclosed, without changing the overall concept or operation of the present invention It is also contemplated that rubber recycling methods 10,110 could be used to recycle rubber which was previously vulcanized with cross-linking curatives different than sulfur without affecting the overall concept or operation of the present invention. It is also contemplated that rubber recycling methods 10,110 of the present invention could be utilized with all types of rubber without changing the overall concept or operation of the present invention. It is contemplated that rubber recycling methods 10,110 could be used alone or in any combination with one another to achieve the desired result.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the present invention has been described with reference to specific embodiments. It shall be understood that these illustrations are by way of example and not by way of limitation, as the scope of the invention is not limited to the exact details shown or described. Potential modifications and alterations will occur to others upon a reading and understanding of this disclosure, and it is understood that the invention includes all such modifications and alterations and equivalents thereof.

Having now described the features, discoveries and principles of the invention, the manner in which the rubber recycling method of the present invention is used and installed, the characteristics of the construction, arrangement and method steps, and the advantageous, new and useful results obtained; the new and useful structures, devices, elements, arrangements, processes, parts and combinations are set forth in the appended claims.

What is claimed is:

1. A method of recycling a vulcanized rubber compound comprising:
   a. grinding said vulcanized rubber compound into a plurality of particles;
   b. treating said plurality of particles with at least one chemical curing agent inhibitor and a solvent capable of solubilizing the at least one chemical curing agent inhibitor, said solvent being capable of swelling the plurality of particles to disperse said at least one chemical curing agent inhibitor within said plurality of particles;
   c. mixing said treated plurality of particles with a fresh rubber compound; and
   d. co-vulcanizing said mixture of said treated plurality of particles and said fresh rubber compound.

2. The method of recycling a vulcanized rubber compound of claim 1, wherein said at least one chemical curing agent inhibitor interferes with or inhibits functionality of at least one of a cure accelerator and a vulcanization curative.

3. A method of recycling a vulcanized rubber compound comprising:
   a. grinding said vulcanized rubber compound into a plurality of particles;
   b. treating said plurality of particles with one or more additives that is capable of swelling the surface of said plurality of particles;
   c. encapsulating each one of said plurality of particles in an adhesion promoting layer, said swelling facilitating interpenetration of said layer into the plurality of particles, said layer at least partially interdiffusing into a network of said plurality of particles, and chemically bonding to the network by intermolecular cross-linking;
   d. mixing said encapsulated plurality of particles with a fresh rubber compound said one or more additives inducing inter-molecular chemical cross-linking between interpenetrating molecules of said fresh rubber compound and said encapsulated plurality of particles; and
   d. co-vulcanizing said mixture of said encapsulated plurality of particles and said fresh rubber compound.

4. The method of recycling a vulcanized rubber compound of claim 3, wherein said adhesion promoting layer is a non-vulcanized rubber.

5. The method of recycling a vulcanized rubber compound of claim 4, wherein said non-vulcanized rubber is an unsaturated rubber selected from the group consisting of natural rubber, polyisoprene, polybutadiene, and poly(butadiene-co-styrene).

6. The method of recycling a vulcanized rubber compound of claim 3, wherein said one or more additives includes at least one of a vulcanization curative, one or more cure accelerators, and one or more cure promotors.

7. The method of recycling a vulcanized rubber compound of claim 6, wherein said one or more cure accelerators is an ultra-accelerator that facilitates fast crosslinking and low temperature crosslinking.

8. The method of recycling a vulcanized rubber compound of claim 6, wherein said one or more cure promotors is zinc oxide or stearic acid.

9. The method of recycling a vulcanized rubber compound of claim 3, wherein said one or more additive is a peroxide.

10. The method of recycling a vulcanized rubber compound of claim 3, wherein said plurality of particles are encapsulated via a physical method selected from the group consisting of suspension coating and spray drying.

11. The method of recycling a vulcanized rubber compound of claim 3, wherein said plurality of particles are encapsulated via a physicochemical process.

12. The method of recycling a vulcanized rubber compound of claim 3, wherein said plurality of particles are encapsulated via coacervation phase separation.

13. The method of recycling a vulcanized rubber compound of claim 3, wherein said plurality of particles is encapsulated via reactive grafting.

14. The method of recycling a vulcanized rubber compound of claim 3, wherein said plurality of particles are encapsulated with more than one layer of said adhesion promoting layer.

15. The method of recycling a vulcanized rubber compound of claim 3, further comprising treating said plurality of particles with at least one chemical curing agent inhibitor.

16. A method of recycling a vulcanized rubber compound comprising:
   a. grinding said vulcanized rubber compound into a plurality of particles;
   b. treating said plurality of particles with one or more additives that is capable of swelling the surface of said plurality of particles;
   c. encapsulating each one of said plurality of particles in an adhesion promoting layer, said swelling facilitating interpenetration of said layer into the plurality of particles, said layer at least partially interdiffusing into a network of said plurality of particles, and chemically bonding to the network by intermolecular cross-linking; and
   d. utilizing said encapsulated or treated plurality of particles as a building block for designing particles that can impart selected properties to a rubber stock.

17. A method of recycling a vulcanized rubber compound comprising:
   a. grinding said vulcanized rubber compound into a plurality of particles;
   b. treating said plurality of particles with at least one chemical curing agent inhibitor and a solvent capable of solubilizing the at least one chemical curing agent inhibitor, said solvent being capable of swelling the plurality of particles to disperse said at least one chemical curing agent inhibitor within said plurality of particles;
c. encapsulating each one of said treated plurality of particles in an adhesion promoting layer;
d. mixing said encapsulated plurality of particles with a fresh rubber compound; and
e. co-vulcanizing said encapsulated mixture of said plurality of particles and said fresh rubber compound.

18. A method of recycling a vulcanized rubber compound comprising:
a. grinding said vulcanized rubber compound into a plurality of particles;
b. treating said plurality of particles with at least one chemical curing agent inhibitor and a solvent capable of solubilizing the at least one chemical curing agent inhibitor, said solvent being capable of swelling the plurality of particles to disperse said at least one chemical curing agent inhibitor within said plurality of particles;
c. utilizing said treated plurality of particles as a building block for designing particles that can impart selected properties to a rubber stock.

* * * * *